US011435113B2

(12) United States Patent
Knoeppel et al.

(10) Patent No.: US 11,435,113 B2
(45) Date of Patent: Sep. 6, 2022

(54) DUAL INPUT WATER HEATER

(71) Applicant: A. O. Smith Corporation, Milwaukee, WI (US)

(72) Inventors: Ray O. Knoeppel, Hartland, WI (US); Jianmin Yin, Racine, WI (US); Chad Edington, Milwaukee, WI (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 550 days.

(21) Appl. No.: 16/269,372

(22) Filed: Feb. 6, 2019

(65) Prior Publication Data

US 2019/0242620 A1 Aug. 8, 2019

Related U.S. Application Data

(60) Provisional application No. 62/626,989, filed on Feb. 6, 2018.

(51) Int. Cl.
| | | |
|---|---|---|
| *F24H 9/20* | (2022.01) | |
| *F23L 17/00* | (2006.01) | |
| *F24H 7/02* | (2022.01) | |
| *F24H 8/00* | (2022.01) | |

(52) U.S. Cl.
CPC .......... *F24H 9/2035* (2013.01); *F23L 17/005* (2013.01); *F24H 7/0266* (2013.01); *F24H 8/00* (2013.01); *F24H 9/2042* (2013.01)

(58) Field of Classification Search
CPC ........... H05K 7/20827; H05K 7/20745; H05K 7/20836; F24H 9/2035; F24H 9/2042; F24H 8/00; F24H 7/0266; F23L 17/005
See application file for complete search history.

(56) References Cited

U.S. PATENT DOCUMENTS 3,570,423 A * 3/1971 Hemmingson ......... F24C 15/20
110/160
5,311,843 A 5/1994 Stuart
5,570,659 A 11/1996 Cohen
(Continued)

FOREIGN PATENT DOCUMENTS

CN 1504701 A 6/2004

OTHER PUBLICATIONS

Parker et al, "Condensing Boiler Assessment: Peachtree Summit Federal Building Atlanta, Georgia" (Year: 2012).*
(Continued)

*Primary Examiner* — Steven S Anderson, II
(74) *Attorney, Agent, or Firm* — Michael Best & Friedrich LLP (57) ABSTRACT

A water heater system includes a tank for storing water; a flue assembly positioned within the tank, the flue assembly adapted to transfer heat from flue gases within the flue assembly to water in the tank; a burner in fluid communication with an inlet end of the flue assembly and operable in at least a high input mode and a low input mode to deliver the flue gases to the flue assembly, the exhaust assembly having a threshold temperature above which the exhaust assembly is not suitable; and an exhaust assembly including a fan, wherein at least in the low input mode, the flue gases condense in the flue assembly, and wherein operation of the fan reduces a temperature of the flue gases in the exhaust assembly to below the threshold temperature at least in the high input mode.

19 Claims, 8 Drawing Sheets

(56) References Cited

U.S. PATENT DOCUMENTS

| | | | |
|---|---|---|---|
| 5,775,268 A | | 7/1998 | Ferguson |
| 6,000,391 A | * | 12/1999 | Timmons ................. F23J 11/02 110/160 |
| 7,992,526 B2 | | 8/2011 | Ritsema et al. |
| 2007/0051819 A1 | * | 3/2007 | Isaacson ................. F23N 1/082 236/20 R |
| 2012/0037096 A1 | * | 2/2012 | Watanabe ................. F24H 1/40 122/14.21 |
| 2013/0319348 A1 | * | 12/2013 | Hughes ..................... F24H 1/12 122/18.2 |
| 2018/0224156 A1 | * | 8/2018 | Steinhafel ............. F24H 9/2035 |

OTHER PUBLICATIONS

Garrabrant, "Development & Validation of a Gas-Fired Residential Heat Pump Water Heater," Stone Mountain Technologies, Inc., <https://www.osti.gov/servlets/purl/1060285> dated Jan. 21, 2013 (25 pages).

International Search Report and Written Opinion for Application No. PCT/US2019/016888 dated Apr. 15, 2019 (20 pages).

International Preliminary Report on Patentability for Application No. PCT/US2019/016888 dated Feb. 24, 2020 (17 pages).

\* cited by examiner

DUAL INPUT WATER HEATER

CROSS-REFERENCE TO RELATED APPLICATIONS

This application claims priority to U.S. Provisional Patent Application No. 62/626,989 filed on Feb. 6, 2018, the entire contents of which are incorporated herein by reference.

BACKGROUND

The present invention relates to a water heater system including a burner and an exhaust in fluid communication with the burner.

SUMMARY

In one aspect, the invention provides a water heater system comprising: a tank for storing water; a flue assembly positioned within the tank and having an inlet end and an outlet end, the flue assembly adapted to transfer heat from flue gases within the flue assembly to water in the tank; a burner in fluid communication with the inlet end of the flue assembly and operable in at least a high input mode and a low input mode to deliver the flue gases to the flue assembly, the exhaust assembly having a threshold temperature above which the exhaust assembly is not suitable; and an exhaust assembly including a fan and being in fluid communication with the outlet end of the flue assembly, wherein at least in the low input mode, the flue gases condense in the flue assembly, and wherein operation of the fan reduces a temperature of the flue gases in the exhaust assembly to below the threshold temperature at least in the high input mode.

In some aspects of the invention, the burner is a power burner, and in the high input mode, the flue gases do not condense in the flue assembly. In some aspects of the invention, the burner is an atmospheric burner, and in the high input mode, the flue gases do condense in the flue assembly. In some aspects of the invention, the water heater system includes a controller coupled to the burner and the fan. The controller activates the fan to rotate at a speed based on the high input mode and the low input mode of the burner. In some aspects of the invention, a sensor is coupled to the controller, and wherein the controller activates the burner in at least one of the high input mode and the low input mode based on an output reading of the sensor. In some aspects of the invention, the sensor is one of a temperature sensor and a flow sensor, and wherein the controller operates the burner in high input mode in response to the sensor indicating an urgent need for heating water in the tank. In some aspects of the invention, the exhaust assembly includes a PVC vent pipe through which flue gases flow, and wherein a controller operates the fan at a speed such that the temperature of the flue gases is reduced below the temperature threshold. In some aspects of the invention, the exhaust assembly includes a dilution air intake, and the fan dilutes the flue gases with ambient air in the exhaust assembly at least in the high input mode. In some aspects of the invention, the fan introduces excessive air into the water heater system for reducing the temperature of the flue gases in the exhaust assembly in at least the high input mode. In some aspects of the invention, the exhaust assembly includes a venturi portion and the fan is positioned downstream of the venturi portion in the exhaust assembly, and the venturi portion includes a dilution air intake configured to dilute the flue gases in the exhaust assembly with ambient air in at least the high input mode.

In another aspect, the invention provides a water heater system comprising: a tank for storing water; a flue assembly positioned within the tank; a burner in fluid communication with the flue assembly and operable in at least a high input mode and a low input mode; and an exhaust assembly including a fan and being in fluid communication with the flue assembly, wherein the burner is operable to switch between the high input mode and the low input mode based on a need for heating water in the tank, wherein the burner operates in the low input mode when the need is a non-urgent need for heating water in the tank, and wherein the burner operates in the high input mode when the need is an urgent need for heating water in the tank.

In some aspects of the invention, the burner is a power burner, wherein in the low input mode, the flue gases condense in the flue assembly, and wherein in the high input mode, the flue gases do not condense in the flue assembly. In some aspects of the invention, the burner is an atmospheric burner, and wherein in the low input mode and the high input mode, the flue gases do condense in the flue assembly. In some aspects of the invention, the exhaust assembly includes a dilution air intake, and the fan dilutes the flue gases with ambient air in the exhaust assembly at least in the high input mode. In some aspects of the invention, the fan introduces excessive air into the water heater system for reducing the temperature of the flue gases in the exhaust assembly in at least the high input mode. In some aspects of the invention, the water heater system includes a controller and a sensor coupled to the burner and the fan. The controller activates the fan to rotate at a speed based on the high input mode and the low input mode of the burner. In some aspects of the invention, a sensor is coupled to the controller, and the controller activates the burner in at least one of the high input mode and the low input mode in response to the sensor indicating the urgent need for heating water in the tank.

In yet another aspect, the invention provides a method to efficiently heat water in a water heater system including a burner operable in at least a high input mode and a low input mode, and communicating with an inlet end of a flue assembly and a fan, the method comprising: heating the water using flue gases from the burner; monitoring a characteristic of the water heater to determine whether there is a need for heating the water; determining whether the need for heating is urgent or non-urgent; activating the burner in the low input mode in response to a non-urgent need for heating, to operate the water heater in a condensing mode in which the flue gases condense in the flue assembly; activating the burner in the high input mode and activating the fan in response to an urgent need for heating; and reducing a temperature of the flue gases in an exhaust assembly in connection with the flue assembly with air supplied by the fan while the burner operates in the high input mode, wherein the temperature is reduced below a threshold temperature suitable for a condensing exhaust assembly.

In some aspects of the invention, the water heater system includes a controller coupled to the burner and the fan, and a sensor coupled to the controller and positioned in the water heater system, and wherein the controller determines the need for heating based on an output reading of the sensor, and wherein the controller activates the burner in at least one of the high input mode and the low input mode based on the need. In some aspects of the invention, the characteristic indicates a performance draw, and wherein the burner is activated in the high input mode or the low input mode based on the performance draw of the water heater system determined by the controller. In some aspects of the invention, the burner is a power burner, and wherein activating the burner in the high input mode further includes operating the water heater in a non-condensing mode in which the flue gases do not condense in the flue assembly. In some aspects of the invention, the burner is an atmospheric burner, and wherein activating the burner in the high input mode further includes operating the water heater in the condensing mode in which the flue gases do condense in the flue assembly.

In yet still another aspect, the invention provides a water heater system comprising: a tank for storing water; a flue assembly positioned within the tank and having an inlet end and an outlet end, the flue assembly adapted to transfer heat from flue gases within the flue assembly to water in the tank; a burner in fluid communication with the inlet end of the flue assembly and operable in at least a high input mode and a low input mode to deliver the flue gases to the flue assembly; and an exhaust assembly including a venturi portion and a fan downstream of the venturi portion, the exhaust assembly being in fluid communication with the outlet end of the flue assembly, wherein the fan is configured to create negative pressure in the flue assembly, wherein at least in the low input mode, the flue gases condense in the flue assembly, and wherein the venturi portion dilutes the flue gases in the exhaust assembly with ambient air at least in the high input mode.

In yet another aspect, the invention provides a water heater system comprising: a tank for storing water; a flue assembly positioned within the tank and having an inlet end and an outlet end, the flue assembly adapted to transfer heat from flue gases within the flue assembly to water in the tank; a burner in fluid communication with the inlet end of the flue assembly and operable in at least a high input mode and a low input mode to deliver the flue gases to the flue assembly; and an exhaust assembly being in fluid communication with the outlet end of the flue assembly, wherein at least in the low input mode, the flue gases condense in the flue assembly, wherein the exhaust assembly includes a proportionalizer configured to introduce air into the water heater system in proportion to the high input mode and the low input mode, and wherein a temperature of the flue gases within the exhaust assembly is reduced by the proportionalizer when the burner operates at least in the high input mode.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
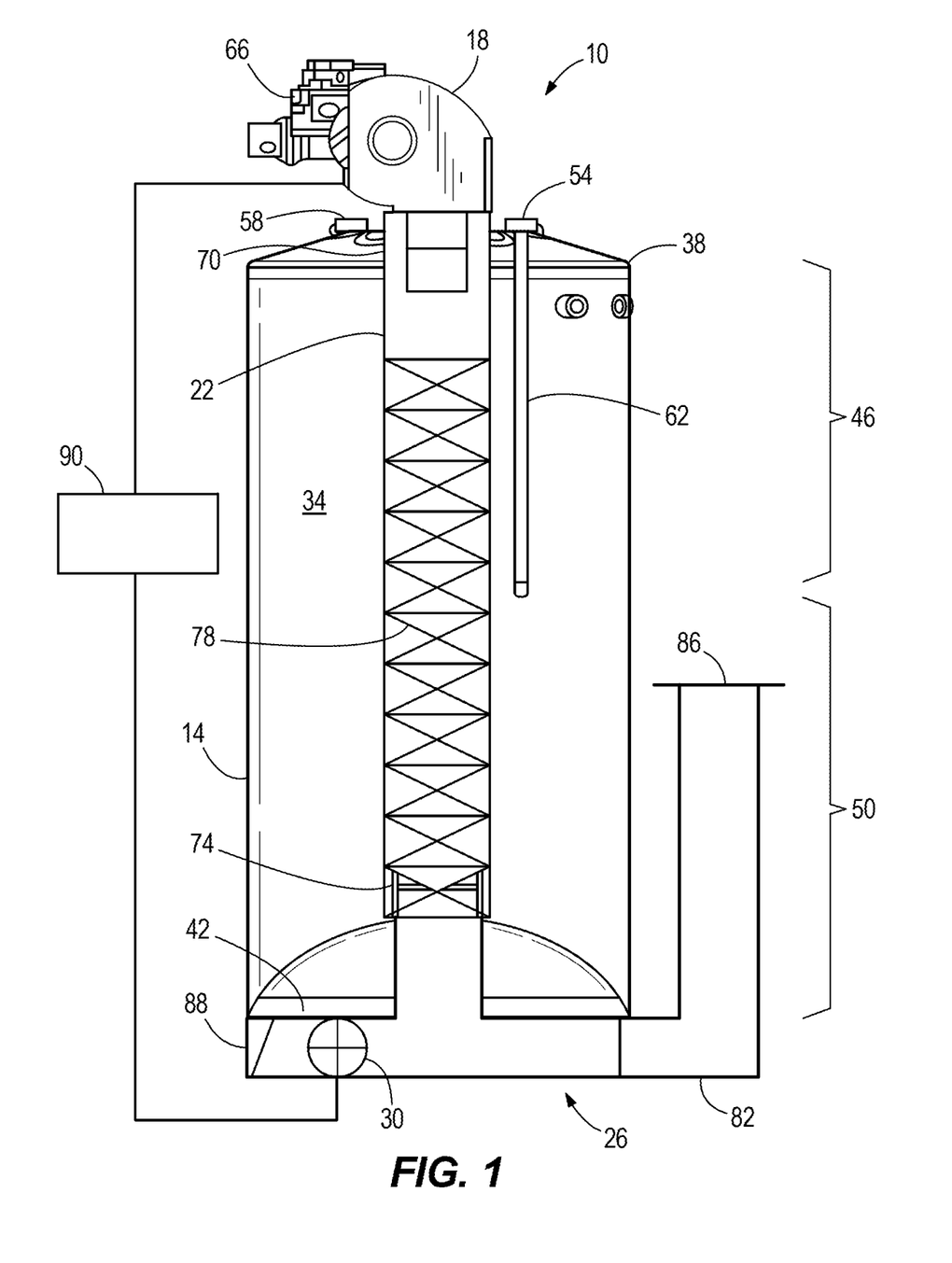
FIG. 1 is a schematic view of a tank-type water heater system including a power burner and a fan positioned in an exhaust assembly.

FIG. 1 illustrates a water heater system 10 including a tank 14, a power burner 18 for heating water in the tank 14, a flue assembly 22, and an exhaust assembly 26. The exhaust assembly 26 includes a fan 30 in fluid communication with the flue assembly 22.

With continued reference to FIG. 1, the tank 14 defines an interior space 34 positioned between a first or "top" end 38 and a second, "lower" end 42 of the tank 14. The interior space 34 includes an upper portion 46 contained by the first end 38 of the tank 14 and a lower portion 50 contained by the second end 42 of the tank 14. The tank 14 is configured to hold a volume of water for heating. For example, the illustrated tank 14 is configured to hold fifty gallons of water.

The water heater system 10 includes a cold water inlet 54 and a hot water outlet 58 in the first end 38 of the tank 14. The illustrated water heater system 10 includes a dip tube 62 in fluid communication with the cold water inlet 54 to introduce cold water into the lower portion 50 of the tank 38. A hot water pipe communicates between the hot water outlet 58 and a hot water access point or point-of-use for drawing hot water from the tank 14 under the influence of water pressure at the cold water inlet 54. Other openings in the tank 14 may include, but not limited to, a drain, a temperature and pressure (T&P) relief valve spud, and an anode spud which are water-tightly closed during ordinary operation. The water heater system 10 further includes insulation (e.g., foam-in-place insulation) around the tank 14 to reduce heat loss.

With continued reference to FIG. 1, the power burner 18 includes a gas-fired burner and a blower 66. The illustrated power burner 18 is positioned above the first end 38 of the tank 14 such that the power burner 18 is a down-firing burner. Specifically, the blower 66 draws air from the surrounding environment for mixing with a gas input of the burner 18. The power burner 18 is in fluid communication with the flue assembly 22 for delivering hot flue gases to the flue assembly 22. The blower 66 is used in combination with the power burner 18 such that blower 66 may be utilized to aid in movement (i.e., flow) of the hot flue gases produced by the power burner 18 through the flue assembly 22.

The power burner 18 is operable to receive a plurality of gas inputs such that the power burner 18 is a dual input power burner 18. In other words, the power burner 18 may receive a range of gas inputs from a relatively low gas input to a relatively high gas input. The power burner 18 is configured to produce the flue gases at a higher temperature (e.g., up to 350° F.) when operating at the high gas input compared to the lower temperatures (e.g., up to 140° F.) in the low gas input. The power burner 18 may be operable in a plurality of input modes. In the illustrated embodiment, the power burner 18 includes at least a first, low input mode and a second, high input mode. For example, in the illustrated embodiment, the low input mode is 25 kBTU/Hr and the high input mode is 40 kBTU/Hr. In other embodiments, the low input mode is at least below 40 kBTU/Hr and the high input mode is equal to or above 40 kBTU/Hr. Still further, in other embodiments, the high input mode is 60 kBTU/Hr.

The water heater system 10 is operable to be a condensing water heater system in at least one of the plurality of input modes for operating at a relatively higher efficiency. In the illustrated embodiment, the flue gases transfer enough heat to the water in the tank 14 to condense in the flue assembly 22 in the low input mode in order to achieve 90% efficiency. In the high input mode, the temperature of the flue gases is relatively higher such that the flue gases do not condense in the flue assembly 22 and achieves at most 87% efficiency. An overall recovery efficiency of the water heater system is at least 89.5% when the power burner 18 operates in the low input mode for 75% of a draw cycle of the water heater system 10.

With continued reference to FIG. 1, the flue assembly 22 is positioned within the tank 14 and is in fluid communication with the power burner 18. The flue assembly 22 includes at least one flue extending through the tank 14 from an inlet end 70 positioned at the first end 38 of the tank 14 to an outlet end 74 opposite the inlet end 70. The inlet end 70 is configured to receive the flue gases from the power burner 18 and the outlet end 74 is configured to allow the flue gases to exit the flue assembly 22. The illustrated flue assembly 22 includes a single five inch diameter flue located at a center of the tank 14. The flue assembly 22 is adapted to transfer heat from the flue gases within the flue assembly 22 to the water in the tank 14. In addition, the illustrated flue assembly 22 includes baffles 78 positioned within the single flue for increasing the heat transfer between the flue gases and the water in the tank 14. In other embodiments, the water heater system 10 may have at least two or more flues and may have any number of baffles 78.

The exhaust assembly 26 is positioned at the second end 42 of the tank 14 and is in fluid communication with the outlet end 74 of the flue assembly 22. The exhaust assembly 26 includes an exhaust 82 (i.e., vent pipe) and an outlet 86 in fluid communication with the atmosphere surrounding the water heater system 10. The exhaust 82 may include multiple sections and may extend from the outlet end 74 of the flue assembly 22 to the outlet 86 of the exhaust assembly 26. The flue gases flow from the flue assembly 22 and through the exhaust 82 before exiting to the atmosphere at the outlet 86. The illustrated exhaust 82 comprises of standard PVC vent pipe that may receive the flue gases at a maximum temperature of 158° F. or lower to inhibit failure (e.g., melting, breaking, etc.) of the exhaust 82 due to high flue gas temperatures. As such, the exhaust assembly 26 may have a suitable threshold temperature that is within the temperature ratings as set by relevant regulations such as a maximum temperature that a material can withstand. For example, in the illustrated embodiment, the suitable temperature threshold may be defined as 158° F. or lower. More specifically, the typical temperature that the flue gases in the exhaust assembly 26 is reduced to is between the range of approximately 125° F. to 130° F. In other embodiments, the suitable temperature threshold is 170° F. or lower. Still further, in other embodiments, the suitable threshold temperature may be based on the amount of time that the material can withstand the maximum temperature before failure. For example, the suitable threshold temperature that the exhaust assembly 26 can withstand is 158° F. or lower for 95% of operation of the burner 18 and 170° F. or lower for the remaining 5% of operation of the burner 18.

With continued reference to FIG. 1, the exhaust 82 is generally T-shaped under the tank 14, with one leg of the "T" extending into the flue assembly 22. Another leg of the "T" extends to the exhaust outlet 86. The third leg of the "T" extends opposite the second leg and includes a dilution air intake 88. The fan 30 is positioned in the third leg of the "T" to draw dilution air into the exhaust 82 through the dilution air intake 88. The fan creates a low or negative pressure zone on the side facing the dilution air intake 88 and a positive, relatively high pressure zone on the side facing the intersection of the three legs of the T-shaped exhaust 82.

The fan 30 may operate in all operating modes of the power burner 18 and may serve different purposes depending on the mode of the power burner 18. For example, when the burner 18 is operating in a relatively high input mode, the exhaust gases exiting the flue assembly 22 may be very hot. In such instance, the relatively cool ambient air drawn into the exhaust 82 by the fan 30 cools the hot flue gases to a temperature below the highest rated temperature of the material (e.g., PVC) of which the exhaust 82 is constructed. Another purpose the fan 30 may perform in conjunction with all modes of the burner 18 is to generate a flow of dilution air in the exhaust assembly 26 toward the exhaust outlet 86 to inhibit leakage of the flue gases through the dilution air inlet 88. Stated another way, the fan 30 generates a biasing pressure or flow to ensure that the flue gases flow steadily out of the flue assembly 22, through the exhaust assembly 26, and out the outlet 86. This biasing pressure or flow is particularly helpful in the low input mode of the burner 18. The path from the power burner 18, through the flue assembly 22, through the exhaust assembly 26, and out the outlet 86 of the exhaust 82 may be referred to as the flue gas flow path.

The fan 30 is operable to rotate in a plurality of speeds. In other words, the fan 30 may rotate at a range of speeds from a relatively low speed to a relatively high speed. The illustrated fan 30 is operable in at least a first, low speed mode and a second, high speed mode. The low speed mode may correspond to the low input mode of the power burner 18 and the high speed mode may correspond to the high input mode of the power burner 18. As such, the speed at which the fan 30 rotates may be in proportion to the input mode of the burner 18 such that the fan 30 may be termed a "proportionalizer". The terms proportion and proportionalizer do not imply that there is a strict linear relationship between fan speed and input mode of the power burner 18 or that the ratio of fan speed to power burner input is always the same; these terms are used only to convey that the fan speed generally increases as the power burner input increases. For example, the flow rate of the dilution air produced by the fan 30 is about 12.1 ft$^3$/min when the burner 18 is in the high input mode, and the flow rate of the dilution air produced by the fan 30 is about 4.0 ft$^3$/min when the burner 18 is in the low input mode. In other embodiments, the flow rate is equal to or above 6.0 ft$^3$/min when the burner 18 is in the high input mode, and the flow rate is at least below 6.0 ft$^3$/min when the burner is in the low input mode. The fan 30 may further include a switch at the dilution air intake 88 of the exhaust assembly 26. The switch may move from a first, open position for allowing ambient air to enter the exhaust assembly 26 to a second, closed position. The switch may be further configured to partially close to limit the amount of ambient air entering the exhaust assembly 26.

Figure 2:
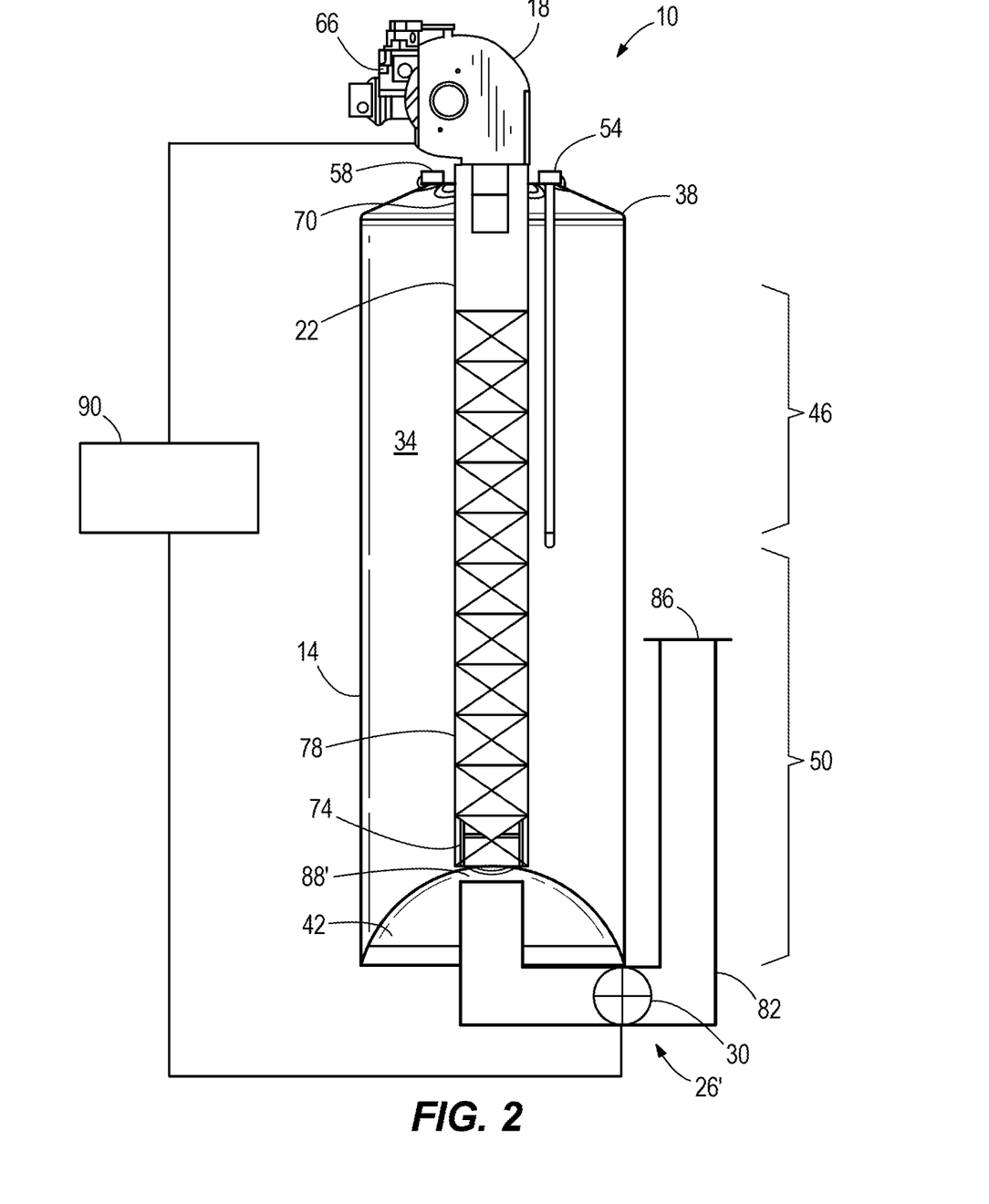
FIG. 2 is a schematic view of a tank-type water heater system including a power burner and a fan positioned in an alternative configuration of an exhaust assembly.

FIG. 2 illustrates the water heater 10 with a modified construction or configuration of the exhaust assembly 26'. The same reference numbers from FIG. 1 are used in FIG. 2, except that modified components are identified with a prime (') mark after the number. The modified exhaust assembly 26' is generally L-shaped under the tank 14. A first leg of the "L" extends up toward the lower end 74 of the flue assembly 22 but does not extend into the lower end 74 as it does in FIG. 1. Instead, the first leg of the "L" defines the dilution air intake 88' and a dilution air gap is defined between the dilution air intake 88' and the lower end 74. The second leg of the "L" in FIG. 2 houses the fan 30. As with the configuration in FIG. 1, the fan 30 generates a negative pressure zone or low pressure zone between the fan 30 and the dilution air intake 88'. In this construction, however, the fan 30 generates the positive, higher pressure zone in the second leg of the "L", between the fan 30 and the outlet 86 of the exhaust assembly 26'. In this regard, the fan 30 can be referred to as a draft inducer because it is pulling the flue gases through the exhaust 82. The fan 30 may also be referred to as a proportionalizer for the same reasons discussed above with respect to the fan 30 in FIG. 1.

In both the configuration of FIG. 1 and the configuration of FIG. 2, the fan 30 creates lower (e.g., negative) pressure on the side facing the dilution air intake 88, 88' and a higher (e.g., positive) pressure on the side facing the outlet 86. This biasing pressure or flow prevents flue gases from escaping through the dilution air intake 88 or 88'. Complete sealing of the dilution air intake 88, 88' would be difficult, but low speed operation of the fan 30 while the burner 18 is operating in low input mode would prevent combustion gas loss. The fan 30 thus ensures flow of the flue gases through the flue gas flow path and not out the dilution air intake 88 or 88'. In this regard, the fan 30 can be said to "bias" the flue gases in a direction from the flue assembly 22 through the exhaust assembly 26 or 26'. Although the power burner 18 may provide sufficient energy to ensure the flue gases flow through the flue gas flow path in high input mode, the fan's "biasing" function may be helpful to ensure this when the power burner 18 is operating in the low input mode.

Figure 5:
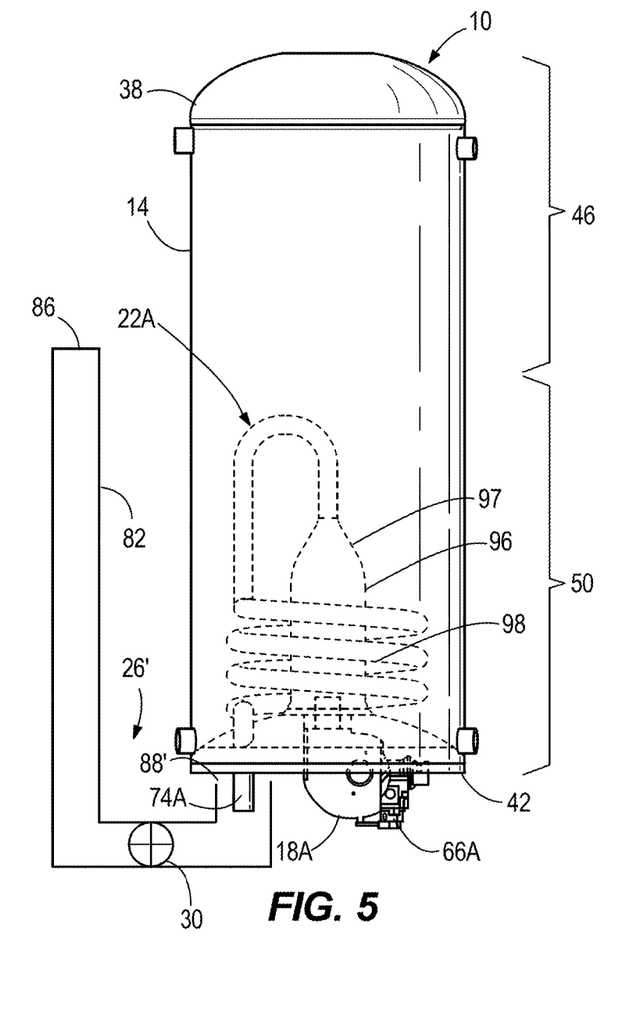
FIG. 5 is a schematic view of a tank-type water heater system including an alternative configuration of a flue assembly.

FIG. 5 illustrates the water heater 10 with an alternative configuration of the power burner 18A and the flue assembly 22A. The water heater 10 of FIG. 5 includes a similar exhaust assembly 26' as shown in FIG. 2. The same reference numbers from FIG. 2 are used in FIG. 5, except that alternative or modified components are identified with a letter (A) after the number. The power burner 18A includes a gas-fired burner 18A and a blower 66A. The illustrated power burner 18A is positioned below the second end 42 of the tank 14 such that the power burner 18A is an up-firing burner. The power burner 18A is in fluid communication with the flue assembly 22A for delivering hot flue gases to the flue assembly 22A.

The flue assembly 22A is positioned within the tank 14 and is in fluid communication with the power burner 18A. The flue assembly 22A includes a combustion chamber 96 and a coiling section 98 that coils from an end of the combustion chamber 96 to an outlet end 74A. More specifically, the coiling section 98 coils about the combustion chamber 96 within the lower portion 50 of the interior space 34 of the tank 14. A portion of the burner 18A extends into the combustion chamber 96 and the blower 66A is positioned below the second end 42 of the tank 14. The power burner 18A operates in a plurality of input modes, from low input (i.e., condensing) to high input (i.e., non-condensing). The combustion chamber 96 is configured to receive the flue gases from the power burner 18A. The flue gases travel from the combustion chamber 96 along the coiling section 98 to the outlet end 74A. The outlet end 74A is configured to allow the flue gases to exit the flue assembly 22A to the exhaust assembly 26'. The illustrated flue assembly 22A includes a narrowing section 97. The narrowing section 97 is shaped as a nozzle and causes the velocity of the flue gases to increase at they are delivered to the coiling section 98.

The configuration of the water heater 10 of FIG. 5 includes the fan 30 within the exhaust 26'. Although the exhaust assembly 26' is generally L-shaped, the second leg of the "L" does not extend under the tank 14. In other embodiments, a portion of the exhaust assembly 26' such as the second leg of the "L" may extend below the tank 14 similar to that as shown in FIG. 2. The fan 30 is positioned in the second leg of the "L". In addition, a dilution air intake 88' (similar to the one shown in FIG. 2) is included to allow dilution air to be drawn into the exhaust assembly 26' by the fan 30. The fan 30 is a proportionalizer of dilution air based on the input mode of the power burner 18A, as discussed above.

It should be noted that the invention is not limited to the configurations illustrated and discussed herein. For example, the power burner 18, 18A may be replaced with an atmospheric burner and a draft-inducing blower may be put in the exhaust 82 to draw the flue gases through the flue 26 and exhaust 82. Such a system would not provide dilution air on the outlet, but instead reduces outlet air temperatures through the introduction of excessive air to the combustion chamber. In other words, air introduced to the water heater system in the combustion chamber may be referred to as "secondary air", and the volume of secondary air introduced may be increased to reduce flue gas temperature in the exhaust assembly 26. In one example, the volume of secondary air introduced may be increased by two times producing the excessive air. In such embodiments, the atmospheric burner is of any type which can be modulated, a commercially available example of such a burner is the swordfish or harmonica style burner available from A. O. Smith Corporation as SWORDFISH BURNER, manufacturer part number 9005889205. The atmospheric burner is modulated (i.e., by selectively adjusting, by way of a valve, the supply of gas to individual burners forming the atmospheric burner) such that in the high input mode, all of the individual burners (e.g., eight burners) receives the gas supply, and in the low input mode, only some of the individual burners (e.g., four burners) receive the gas supply. Furthermore, in such embodiments, the blower in the exhaust is the proportionalizer because the blower is set to work at a speed proportional to the input mode of the atmospheric burner, which in turn draws an appropriate amount of secondary air into the combustion chamber. The blower can generate enough negative pressure in both input modes so that lower cost atmospheric burners could be used. As such, although the efficiency of the water heater may decrease (i.e., to about 80% efficient in the high input mode), the cost of the water heater may be reduced. Due to the excessive air in the combustion chamber, the flue gases may condense in both the high input mode and the low input mode. In addition, the temperature of the flue gases in the exhaust may be reduced below a predetermined temperature threshold (e.g., 158° F.) in both input modes. This configuration might be applied as a modification of the VERTEX model of water heaters available from A. O. Smith Corporation.

Figure 7:
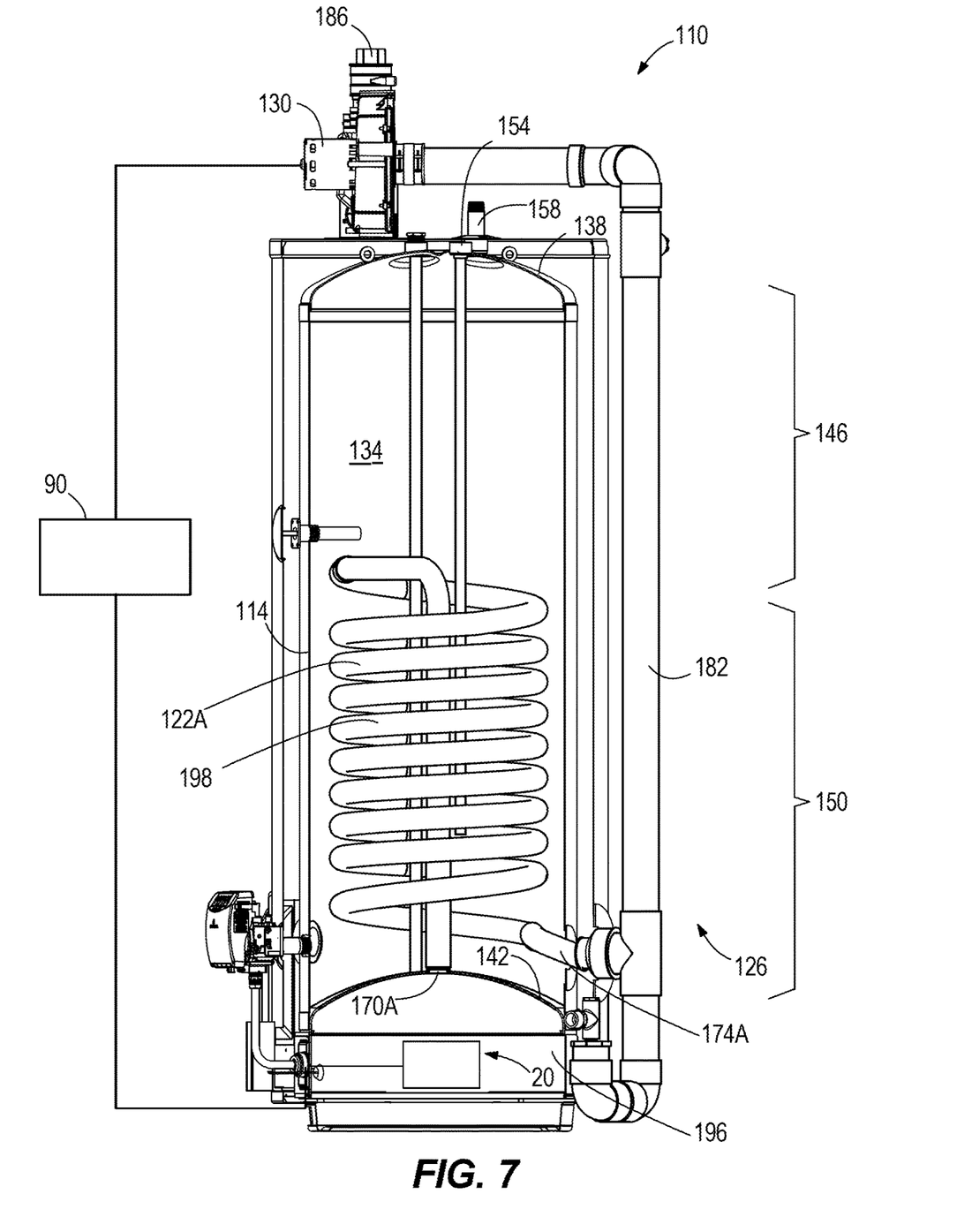
FIG. 7 is a side cross-sectional view of a tank-type water heater system according to another embodiment of the invention including an atmospheric burner.

FIG. 7 is a representation of the configuration of a water heater 110 including a modulated atmospheric burner 20 and the draft inducing blower or fan 130 positioned in the exhaust 182. Like components and features as the water heater shown in FIGS. 1 and 5 are labeled in FIG. 7 with like reference numerals plus "100". The atmospheric burner 20 is positioned below the second end 142 of the tank 114. The flue gases, produced by the atmospheric burner 20, travel through the flue assembly 122A (i.e., from the combustion chamber 196 along the coiling section 198 to the outlet end 174A) within the interior space 134 of the tank 114. Subsequently, the flue gases are drawn through the exhaust 182 to the outlet 186. The atmospheric burner 20 is operable in the high input mode and the low input mode in which the flue gases will condense in both input modes. In the high input mode, more heat may be lost due to the increase in excessive air flowing through the water heater system to the outlet 186, thereby decreasing the efficiency.

With reference to FIGS. 1-8, the water heater system 10, 110 includes a controller 90 coupled to the burner 18, 18A, 20 and the fan 30, 130. The controller 90 is further coupled to a sensor 94 (FIGS. 3-4) positioned within the water heater system 10, 110. The sensor 94 may be a temperature sensor (FIG. 3) positioned within the tank 14, 114 for sensing a temperature of the water within the tank 14, 114. The sensor 94 may also be a flow sensor (FIG. 4) positioned within the hot water pipe for sensing a flow of water out of the tank 14, 114. Alternatively, the sensor 94 may be a sensor that interprets water temperature or water flow rather than directly sensing by contact with the water. For example, the sensor may be affixed to the tank wall and interpret water temperature based on the temperature of the tank wall. As used herein, the term "sense" when used to refer to operation of the sensor 94 includes directly sensing water temperature or flow through direct contact with the water or interpreting water temperature or flow through sensing another variable.

An output reading of the sensor 94 is used to determine a characteristic of the water heater system 10, 110 in which the characteristic may include, but not limited to, a temperature of the water in the tank 14, 114, a rate of change of temperature of water in the tank 14, 114, a flow of water out of the tank 14, 114, a rate of flow of water out of the tank 14, 114, a combination of temperature, flow, rate of change of either, or any other characteristic indicative of a performance draw of the water heater system 10, 110 (i.e., small draw of hot water from the tank 14, 114, large draw of hot water from the tank 14, 114, etc.). For example, the performance draw is a small draw if the temperature of the water in the tank 14, 114 remains above a temperature limit or the flow of water in the hot water pipe 62 remains below a flow limit.

The controller 90 is configured to activate (i.e., operate) the burner 18, 18A, 20 in one of the plurality of input modes based on the output reading of the sensor 94. Specifically, the output reading of the sensor 94 indicates the performance draw. The controller 90 activates the burner 18, 18A, 20 into one of the plurality of input modes based on the performance draw determined by the controller 90. For example, the controller 90 activates the burner 18, 18A, 20 into the high input mode, if the output reading of the temperature sensor 94 is below the temperature limit. In another example, the controller 90 activates the burner 18, 18A, 20 into the high input mode, if the output reading of the flow sensor 94 is above the flow limit.

The controller 90 is also configured to activate (i.e., operate) the fan 30, 130 to rotate at one of the plurality of speeds based on the input mode of the burner 18, 18A, 20 or based on the output reading of the sensor 94. For example, the controller 90 may activate the fan 30, 130 to rotate at the high speed, when the controller 90 operates the burner 18, 18A, 20 into the high input mode. In the illustrated embodiment of FIG. 1, the controller 90 operates the fan 30 at the high speed to dilute the flue gases in the exhaust assembly 26 to a temperature of 158° F. or lower. In the illustrated embodiment of FIG. 7, the controller 90 operates the fan 130 at the high speed to increase the excessive air for lowering a temperature of the flue gases in the exhaust assembly 26 to a temperature of 158° F. or lower. The fan 30, 130 is particularly useful for this purpose when the burner 18, 18A, 20 is operating in high input mode and the flue gases are relatively hot when they flow out of the flue assembly 22, 22A. In addition, adding dilution air to the exhaust flow by the fan 30 when the burner 18, 18A is operating in low input mode is also possible.

The output reading of the sensor 94 may be further used to monitor the characteristic of the water heater system 10, 110 in order to determine whether there is a need for heating water in the tank 14, 114. Specifically, the sensor 94 is configured to indicate to the controller 90 the need for heating water in the tank 14, 114 based on the output reading (i.e., the characteristic indicating the performance draw), in which the need may be a non-urgent need or an urgent need.

The urgent need is defined as a condition in which the burner 18, 18A, 20 is not expected to meet use requirements operating in the low input mode, such conditions including, but not limited to, rapid hot water depletion due to a large draw, unexpected large standby losses, or expected/scheduled large draw to occur. The controller 90 operates the burner 18, 18A, 20 in the high input mode in response to the sensor 94 indicating the urgent need for heating water in the tank 14. For example, the controller 90 activates the burner 18, 18A, 20 in the high input mode, if the output reading of the temperature sensor 94 is below the temperature limit indicating that there is the urgent need for heating water. In another example, the controller 90 activates the burner 18, 18A, 20 in the high input mode, if the output reading of the flow sensor 94 is above the flow limit indicating that there is the urgent need for heating water.

The controller 90 is configured to adjust the plurality of input modes of the burner 18, 18A, 20 and the plurality of speeds of the fan 30, 130 based on the output reading of the sensor 94. The controller 90 may operate the burner 18, 18A, 20 from any one of the plurality of input modes to any one of the other plurality of input modes. Similarly, the controller 90 may operate the fan 30, 130 to rotate from any one of the plurality of speeds to any one of the other plurality of speeds. In the illustrated embodiment, the controller 90 may operate the burner 18, 18A, 20 from the high input mode to the low input mode or from the low input mode to the high input mode and the fan 30, 130 from the high speed to the low speed or from the low speed to the high speed.

In operation of the water heater system 10, 110, the controller 90 operates the burner 18, 18A, 20 in the low input mode in response to the sensor 94 indicating a non-urgent need (i.e., small performance draw, standby, etc.). Accordingly, the controller 90 operates the fan 30, 130 in the low speed. The flue gases flow from the burner 18, 18A, 20 and through the flue assembly 22, 22A. The flue gases condense in the flue assembly 22, 22A to achieve at least 90% efficiency of the water heater system 10, 110 in the low input mode.

The controller 90 monitors the characteristic (i.e., the output reading) for determining the need of the water heater system 10, 110. The controller 90 activates (i.e., switches) the burner 18, 18A, 20 in the high input mode and the fan 30, 130 to the high speed when an urgent need (i.e., large performance draw, large standby losses, etc.) is determined.

Simultaneously, in the embodiment of FIG. 1, the controller 90 activates (i.e., switches) the fan 30 in the high speed to dilute the flue gases in the exhaust assembly 26 or 26' with ambient air from the atmosphere to below the threshold temperature suitable for the exhaust assembly 26 or 26' to withstand. The flue gases do not condense in the flue assembly 22, 22A due to the higher flue gas temperatures and the water heater system 10 is at most 83% efficient in the high input mode. Similarly, in the embodiment of FIG. 7, the controller 90 simultaneously activates (i.e., switches) the fan 130 in the high speed to increase the excessive air to lower the flue gas temperature in the exhaust assembly 126 to below the threshold temperature suitable for the exhaust assembly 126 to withstand. The flue gases do condense in the flue assembly 122A due to the excessive air in the combustion chamber 196 and the water heater system 110 is less than 83% efficient (e.g., about 80%) efficient in the high input mode.

The controller 90 continues to monitor the characteristic of the water heater system 10 while operating the burner 18, 18A, 20 in the high input mode until the controller 90 determines the non-urgent need based on the output reading of the sensor 94. The controller 90 then activates (i.e., switches) the burner 18, 18A, 20 in the low input mode and the fan 30, 130 in the low speed. The controller 90 operates in this loop to control the plurality of input modes of the burner 18, 18A, 20 and the plurality of speeds of the fan 30, 130 for achieving maximum allowed efficiency and inhibiting failure of the exhaust assembly during the draw cycle.

In other configurations, multiple temperature sensors 94 may be used to determine whether high or low input is required. One sensor 94 may be positioned near the top of the tank 14, 114 to control the outlet temperature and one or more lower temperature sensors 94 to determine the heat content of the tank 14, 114.

Test data indicate that the present invention can achieve good efficiency results at different input modes. Table 1 below shows the test results for the configuration of the water heater 10 of FIG. 2.

the same time period in comparison to lower input conventional water heaters. Table 2 below shows the test results from testing of the water heater 10 in the configuration of FIG. 2 (water heater B—dual mode), and conventional water heaters (water heaters A, C, and D).

TABLE 2

| Modes | Water Heater A — | Water Heater B | | | Water Heater C — | Water Heater D — |
|---|---|---|---|---|---|---|
| | | High Input mode | Low Input Mode | Dual | | |
| Input (kBTU/Hr) | 76 | 60 | 25 | 25/60 | 50 | 40 |
| Volume (gal) | 48.5 | 50 | 50 | 50 | 40 | 49.5 |
| Recovery Efficiency (%) | 89.5 | 85.6 | 93.1 | 87 | 72 | 80 |
| Draw Volume (gal) | 10.7 | 27 | 27 | 27 | 27 | 27 |
| Amount of hot water supplied after the first hour (gal) | 137.9 | — | — | 99.5 | 87 | 84.9 |

As shown in table 2, the gas input varies between the different types of water heaters A-D. Water heater A had the highest gas input at 76 kBTU/Hr and water heater D had the lowest gas input at 40 kBTU/Hr. As such, water heater A may be considered a high input water heater and water heaters C and D may be considered lower input water heaters. The water heater B of the present invention includes a dual gas input of 25 kBTU/hr and 60 kBTU/Hr such that the water heater B may be considered a dual input water heater. Furthermore, the amount of water that each tank of the water heater A-D can hold also varied between 40 gallons (water heater C) and 50 gallons (water heater B).

The test data of the different water heaters A-D in table 2 includes a recovery efficiency of each water heater A-D based on a uniform energy factor (UEF) rating. All of the water heaters A-D were tested using a 27 gallon draw except

TABLE 1

| Test | Burner Input | Iris Diameter (in) | Dilution Blower Setting (Volts) | Flue Temperature (° F.) | Diluted PVC Temperature | CO2 | Excess Air (%) | Dilution Air (ft³/min) | Efficiency |
|---|---|---|---|---|---|---|---|---|---|
| A | 60k | 1.45 | 12 | 272 | 120 | 8.80 | 40% | 25.4 | 85.1% |
| B | 24k | 1.45 | 12 | 188 | 86 | 8.82 | 40% | 25.0 | 94.6% |
| C | 25k | 1.45 | 2 | 145 | 118 | 8.90 | 40% | 8.5 | 93.2% |
| D | 24k | 1.00 | 12 | 186 | 118 | 8.72 | 53% | 12.7 | 91.9% |

Test A (Standard High Input Operation) included high flue temperature and resulted in higher efficiency than a typical 82% water heater. Test B (Low Input with high blower speed) provided about 5× higher dilution air than required and resulted in high efficiency and good combustion, but involved significant dilution air which would result in the loss of household air. Test C (Low Input with reduced blower speed) resulted in high efficiency and good combustion and was the best performance of the system in low input mode. Test D (Low Input with high blower speed but reduced dilution air opening using a damper) resulted in high efficiency but involved excessive dilution air results and lower efficiency, and was the second best performance at low input.

Test data indicate that the present invention can achieve a higher recovery efficiency and supply more hot water during for water heater A (based on a 10.7 gallon draw). In addition, a first hour draw test was performed for each water heater A-D. The first hour draw test determines the amount of hot water a water heater can provide in the first hour of operation.

Although water heater A was able to supply the largest amount of hot water at the end of the first hour and the highest recovery efficiency, water heater A is a high input water heater. The lower input water heaters C and D had the lowest recovery efficiency and the lowest amount of hot water supplied after the first hour, respectively. The water heater B of the present invention had a recovery efficiency of 87%, which is closer to the recovery efficiency of the high input water heater A than the lower input water heaters C and D. The dual input water heater B was also able to supply more hot water after the first hour draw test than either of the lower input water heaters C and D.

Figure 3:
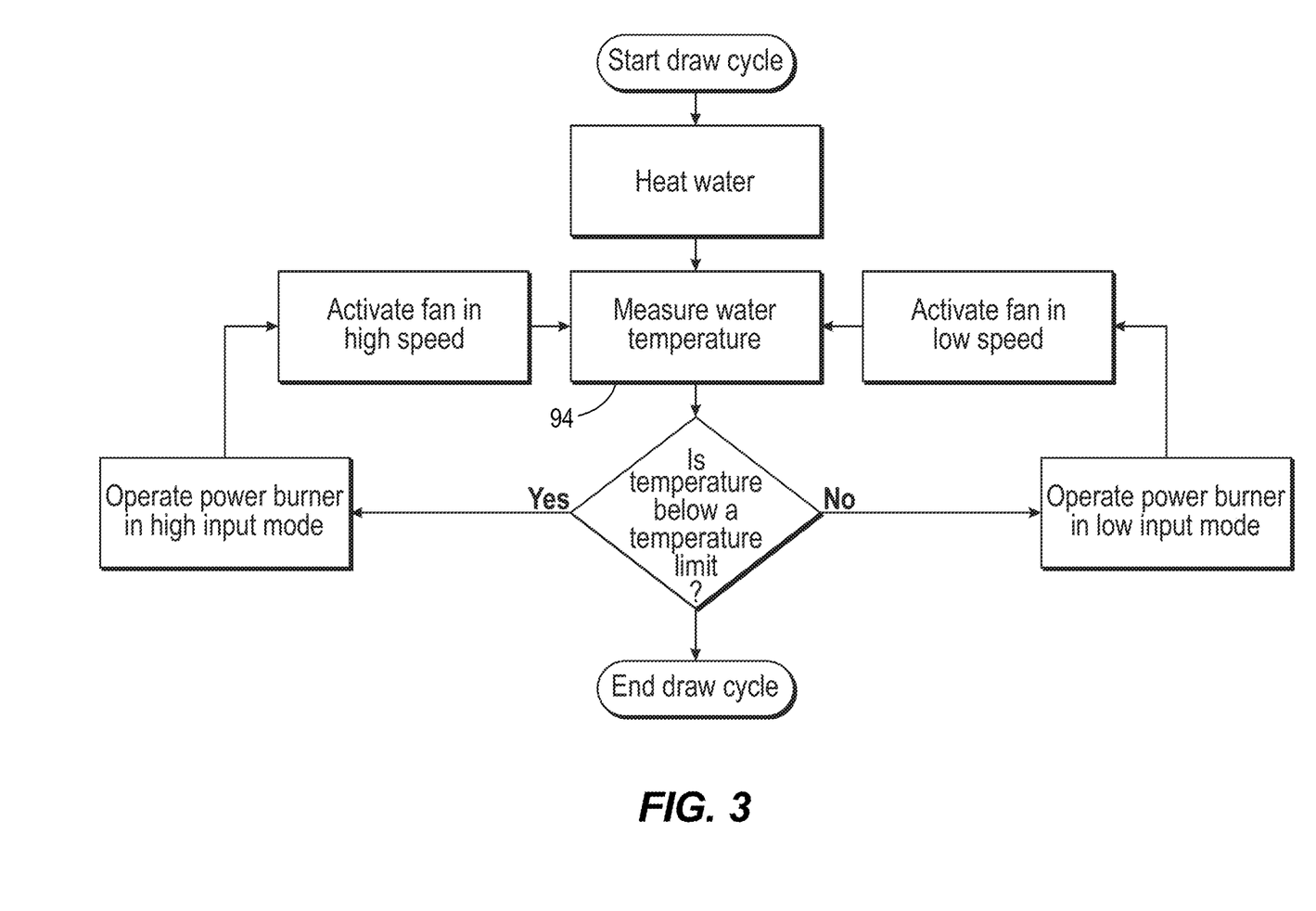
FIG. 3 is a flow diagram illustrating an exemplary method of operating the water heater systems of FIGS. 1 and 2.
Figure 4:
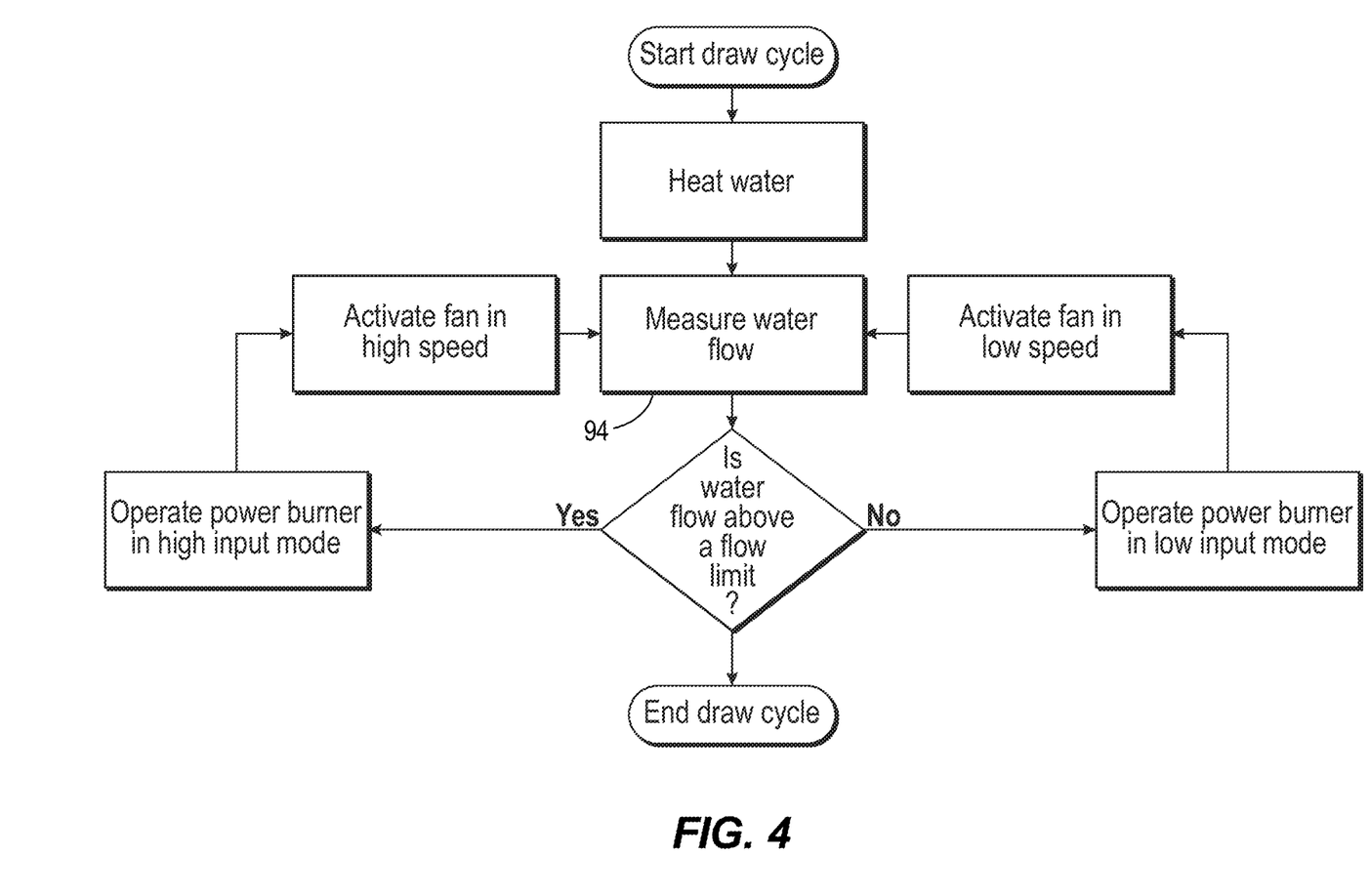
FIG. 4 is another flow diagram illustrating an exemplary method of operating the water heater systems of FIGS. 1 and 2.

Table 3 below illustrates the recovery efficiency of the dual input water heater B using temperature readings of the water within the tank 14. The recovery efficiency test data shown in FIG. 3 is based on the first draw of the UEF test conducted using a high usage draw pattern (e.g., a 27 gallon draw).

TABLE 3

| Test | A | B | C |
|---|---|---|---|
| Input (kBTU/Hr) | 25 | 60 | 25/60 |
| Temperature difference one hour before high usage draw (° F.) | 11.1 | 9.6 | 8.6 |
| Temperature difference after first recovery (° F.) | 18.2 | 14.3 | 13.8 |
| Recovery Efficiency (%) | 93.1 | 85.6 | 87.0 |

The temperature difference of the water within the tank 14 was determined using two temperature sensors positioned with the tank 14. The first temperature sensor was positioned proximate the top end 38 (i.e., about 4 inches from the top end 38) within the upper portion 46 of the tank 14. The second temperature sensor was positioned proximate the bottom end 42 (i.e., about 28 inches from the top end 38) within the lower portion 50 of the tank 14. Test C includes the test data for the dual input water heater of the present invention. Test C had the highest recovery efficiency of 87%. The overall recovery efficiency of the UEF draw was also estimated using the equation:

$$\eta_{total} = \frac{\eta_C * t_C + \eta_A * t_A + \eta_B * t_{Bigh}}{t_{total}}$$

Specifically, η equals the recovery efficiency calculated for each test A-C and t equals the estimated time that the power burner is operating in the input mode during a water draw. Using this equation and the test data in table 3, the estimated overall recovery efficiency over an entire UEF draw is 91%.

Test data indicate that the present invention can achieve appropriate combustion gas levels. Table 4 below shows the analysis of the combustion gas quality prior to the addition of dilution air.

TABLE 4

| Input (kBTU/Hr) | 27 | 60 |
|---|---|---|
| Blower speed (V) | 7.85 | 8.75 |
| Fan speed (V) | 4.25 | 12 |
| CO2 (%) | 8.9 | 8.3 |
| CO (ppm) | 31 | 12 |
| O2 (%) | 5.3 | 6.1 |
| NOx (ppm) | 18 | 16 |
| Excess Air (%) | 30 | 40 |

Testing of the low input mode (27 kBTU/Hr) and the high input mode (60 kBTU/Hr) illustrated that the levels of CO are less than 50 ppm and the levels of NOx are less than 20 ppm. In particular, the CO level in the low input mode is 31 ppm and the NOx level is 18 ppm. The CO level in the high input mode is 12 ppm and the NOx level is 16 ppm. As such, the combustion gas quality of the power burner 18, 18A in each input mode was determined to be within appropriate levels.

Test data indicate that the present invention can achieve lower temperatures of the flue gases within the exhaust in both the high input mode and the low input mode. Table 5 below shows the test data.

TABLE 5

| Input | kBTU/Hr | 60 | 25 |
|---|---|---|---|
| Flue Temp | ° F. | 290 | 170 |
| Exhaust Temp | ° F. | 130 | 100 |
| Dilution Air | ft^3/min | 12.1 | 4 |
| Total Air | ft^3/min | 20.7 | 6.2 |
| % of Dilution Air from Full Fire | % | — | 33% |

Dilution air was added to the flue gases produced in the high input mode (60 kBTU/Hr) and the low input mode (25 kBTU/Hr). The temperature of the exhaust 82 was lowered to 130° F. in the high input mode, and the temperature of the exhaust 82 was lowered to 100° F. in the low input mode. As such, the temperature of the flue gases in the exhaust 82 in both the high and low input modes is lower than 158° F.

Figure 6:
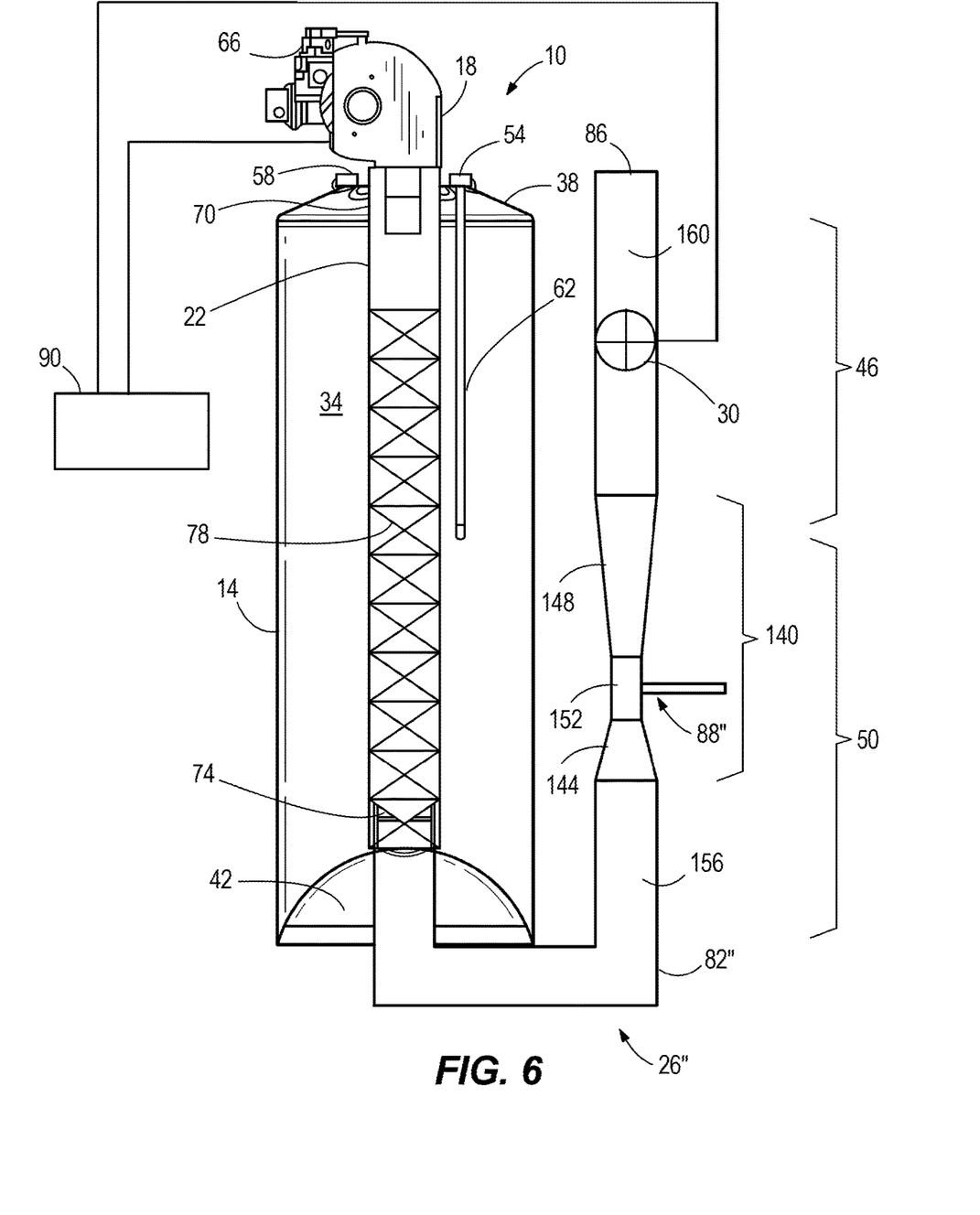
FIG. 6 is a schematic view of a tank-type water heater system including a power burner and an alternative configuration of an exhaust assembly.

FIG. 6 illustrates the water heater 10 with a modified construction or configuration of the exhaust assembly 26". The same reference numbers from FIG. 1 are used in FIG. 6, except that modified components are identified with a double prime (") mark after the number. Similar to the water heater 10 of FIG. 5, the water heater 10 includes an up-firing burner 18A. Furthermore, similar to the exhaust assembly 26' of FIG. 2, the modified exhaust assembly 26" is generally L-shaped under the tank 14. A first leg of the "L" extends up toward the outlet end 74 of the flue assembly 22 (similar as in FIG. 2), but also extends into the outlet end 74 as it does in FIG. 1. The second leg of the "L" in FIG. 6 extends below the tank 14 from the first leg of the "L" to the exhaust 82".

In this configuration of the exhaust assembly 26", the exhaust assembly 26" includes a venturi portion 140 and the fan 30 positioned downstream (i.e., relative to the flow of flue gases) of the venturi portion 140. The venturi portion 140 is positioned between the second leg of the "L" and the outlet 86. The venturi portion 140 includes a first section 144, a second section 148, and an intermediate section 152 extending between the first and second sections 144, 148. The first section 144 tapers or becomes more narrow from a bottom portion 156 of the exhaust 82" to the intermediate section 152. The second section 148 enlarges or expands from the intermediate section 152 to a top portion 160 of the exhaust 82".

The fan 30 is positioned between the second section 148 of the venturi portion 140 and the outlet 86. Similar to the previous embodiments, the fan 30 is operable to rotate in a plurality of speeds corresponding to the input mode of the power burner 18, 18A. As such, the fan 30 may also be referred to as a proportionalizer for the same reasons discussed above with respect to the fan 30 in FIG. 1. The fan 30 generates a biasing pressure or flow to ensure that the flue gases flow steadily out of the flue assembly 22, 22A, through the exhaust assembly 26", and exiting through the outlet 86. This biasing pressure or flow is particularly helpful in the low input mode of the burner 18, 18A.

The venturi portion 140 includes a dilution air intake 88" defined as a bore positioned at the intermediate section 152 (i.e., the smallest cross-section of the venturi portion 140). Similar to the embodiment of FIG. 2, the fan 30 generates a negative pressure zone or low pressure zone between the outlet end 74 and the fan 30 such that the fan 30 can be referred to as a draft inducer because it is pulling the flue gases through the exhaust 82". As such, the pressure is reduced in the exhaust 82" where the dilution air intake 88" is located by the fan 30. The fan 30 is further configured to pull the flue gases through the venturi portion 140, and past the dilution air intake 88".

The venturi portion 140 (i.e., the first section 144) causes the velocity of the flue gases entering the intermediate section 152 to increase, thereby further reducing a pressure of the flue gases where the dilution air intake 88" is located (i.e., in the intermediate section 152). More specifically, the pressure of the flue gases in the intermediate section 152 is reduced by the first section 144 to a pressure that is less than atmospheric pressure. This creates a vacuum at the bore such that cooler outside air is drawn through the bore into the exhaust 82" by the vacuum. This cooler outside air or dilution air mixes with the hot flue gases in the exhaust 82" thereby lowering the temperature of the flue gases within the exhaust 82" that is flowing to the outlet 86. As such, the flue gases in the exhaust assembly 26" may be diluted by the dilution air to a temperature of 158° F. or lower.

The velocity at which the flue gases is flowing across the bore in the intermediate section 152 determines the amount of dilution air drawn into the exhaust 82". In other words, the amount of dilution air is in proportion to the velocity of the flue gases flowing through the exhaust 82". In particular, the velocity of the flue gases entering the bottom portion 156 of the exhaust 82" when the fan 30 is operating in the high speed is faster than the velocity of the flue gases entering the bottom portion 156 of the exhaust 82" when the fan 30 is operating in the low speed. Although both of these velocities is increased as the flue gases flow through the venturi portion 140, the first section 144 increases the velocity by the same amount whether the fan 30 is operating in the high speed or low speed. As such, when the fan 30 is operating in the high speed, more dilution air is drawn into the exhaust 82" than when the fan is operating in the low speed.

The controller 90 in the configuration of FIG. 6 is operable to adjust the input mode of the power burner 18A and the speed of the fan 30 in the exhaust 82". The temperature of the flue gases in the exhaust 82" may be reduced in any of the input modes of the power burner 18, 18A and the corresponding speeds of the fan 30.

Figure 8:
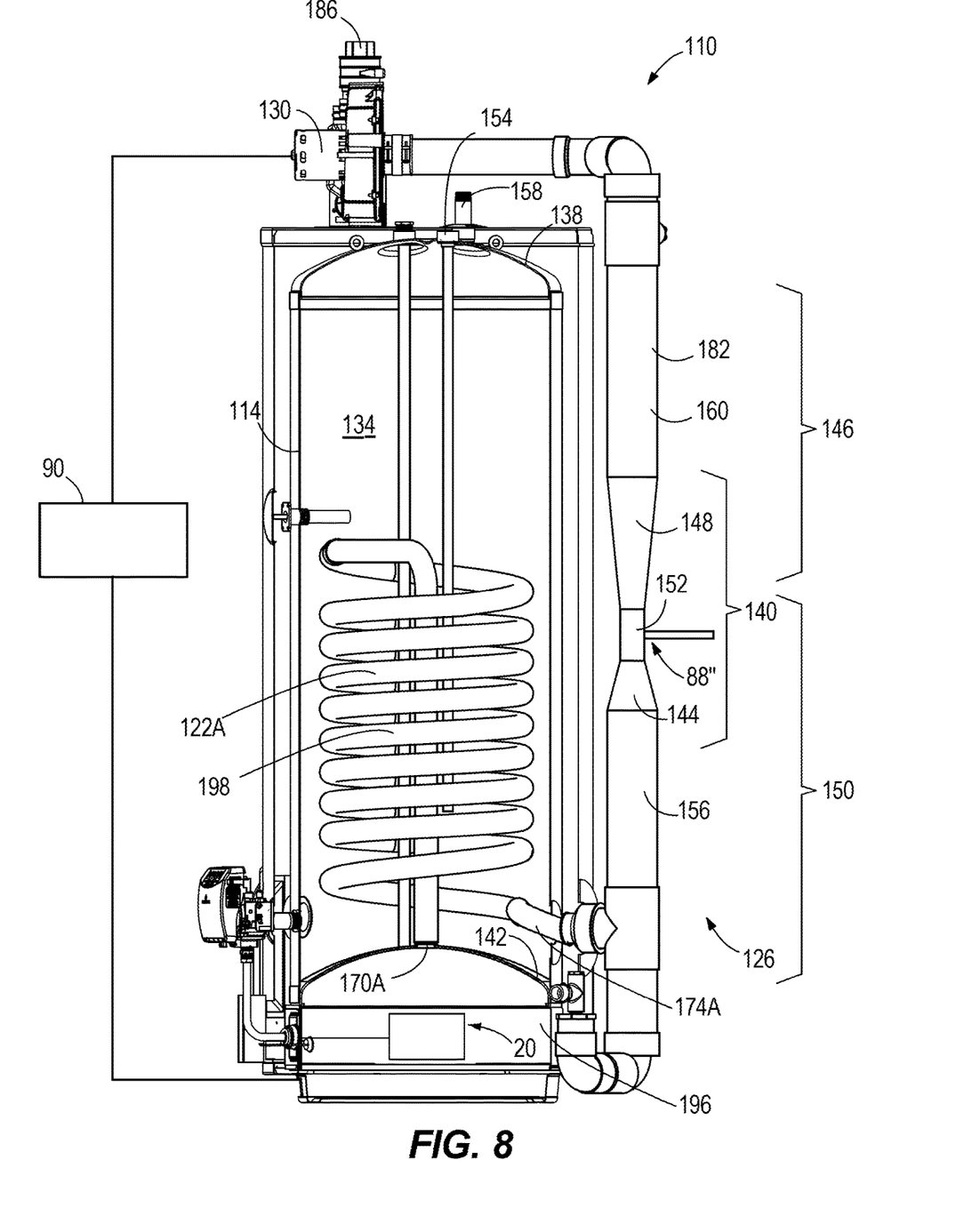
FIG. 8 is a side cross-sectional view of a tank-type water heater system according to another embodiment of the invention including an atmospheric burner and an alternative configuration of an exhaust assembly.

In another embodiment as shown in FIG. 8, the water heater 110 of FIG. 7 includes the alternative configuration of the exhaust assembly 126" of FIG. 6. The same reference numbers from FIGS. 6 and 7 are used in FIG. 8. In particular, the exhaust assembly 126" includes the venturi portion 140. The draft inducing fan 130 is positioned downstream of the venturi portion 140. The fan 130 is operable to rotate in a plurality of speeds corresponding to the input mode of the atmospheric burner 20. Unlike the configuration of the water heater 110 of FIG. 7, a rotational speed of the fan 130 is configured to draw the dilution air through dilution air intake 88" of the venturi portion 140. The amount of dilution air drawn is increased by increasing the speed of the fan based on the input mode of the burner 20. As such, the fan 30 may also be referred to as a proportionalizer for the same reasons discussed above with respect to the fan 30 in FIG. 1. Furthermore, the rotational speed of the fan 130 may be configured such that there is or is not an increase in excessive air drawn into the combustion chamber 196.

Furthermore, in another embodiment of FIG. 6 or FIG. 8, the position of the first section 144 and the dilution air intake 88" may be reversed such that the bore of the dilution air intake 88" is in fluid communication with the bottom portion 156 of the exhaust 82", and the first section 144 is in fluid communication with the outside air. In one example as referred to in FIG. 6, the intake 88" is fluidly connected between the L-shaped portion and the lower portion 156, and the first section 144 is open to the outside air. The second section 148 is fluidly connected to the lower portion 156.

Thus, the invention provides, among other things, a water heater system including a burner and a fan positioned in an exhaust. The exhaust may be a standard PVC vent pipe to aid in manufacturing of the water heater system. The burner is operable to switch between at least a low input mode and a high input mode and the fan is operable to switch between at least a low speed and a high speed based on a need for heating water such that the water heater system can achieve maximum allowed efficiency and inhibit failure of the exhaust assembly. Various features and advantages of the invention are set forth in the following claims.

What is claimed is:

1. A water heater system comprising:
a tank for storing water;
a flue assembly positioned within the tank and having an inlet end and an outlet end, the flue assembly adapted to transfer heat from flue gases within the flue assembly to water in the tank;
a burner in fluid communication with the inlet end of the flue assembly and operable in at least a high input mode and a low input mode to deliver the flue gases to the flue assembly;
an exhaust assembly including a fan and being in fluid communication with the outlet end of the flue assembly;
a controller; and
a sensor coupled to the controller,
wherein the controller activates the burner in the high input mode or the low input mode based on an output reading of the sensor, and
wherein the flue gases do not condense in the flue assembly when operating in the high input mode, and
wherein the flue gases condense in the flue assembly when operating in the low input mode, and
wherein operation of the fan reduces a temperature of the flue gases in the exhaust assembly to below
a threshold temperature at least in the high input mode, the threshold temperature being a temperature rating of a construction material of the exhaust assembly.

2. The water heater system of claim 1, wherein the burner is a power burner.

3. The water heater system of claim 1, wherein the burner is an atmospheric burner.

4. The water heater system of claim 1, wherein the controller operates the fan to rotate at a first speed when the burner is operating in the high input mode and at a second speed lower the first speed when the burner is operating in the low input mode.

5. The water heater system of claim 1, wherein the sensor is one of a temperature sensor and a flow sensor, and wherein the controller operates the burner in the high input mode in response to the sensor indicating that a need for heating water in the tank cannot be met at the low input mode.

6. The water heater system of claim 1, wherein the burner operates in the high input mode or the low input mode based on a performance draw of the water heater system determined by the controller.

7. The water heater system of claim 1, wherein the fan is adapted to bias the flue gases in a direction from the flue assembly through the exhaust assembly in at least the low input mode.

8. The water heater system of claim 1, wherein the temperature threshold is no greater than 158F, and wherein the controller operates the fan at a predetermined speed such that the temperature of the flue gases is reduced below the temperature threshold.

9. The water heater system of claim 1, wherein the low input mode is below 40 kBTU/Hr and the high input mode is equal to or above 40 kBTU/Hr.

10. The water heater system of claim 1, wherein the exhaust assembly includes a dilution air intake, and wherein the fan dilutes the flue gases with ambient air in the exhaust assembly at least in the high input mode.

11. The water heater system of claim 1, wherein the fan introduces excessive air into the water heater system for reducing the temperature of the flue gases in the exhaust assembly in at least the high input mode.

12. The water heater system of claim 1, wherein the exhaust assembly includes a venturi portion and the fan is positioned downstream of the venturi portion in the exhaust assembly, and wherein the venturi portion includes a dilution air intake configured to dilute the flue gases in the exhaust assembly with ambient air in at least the high input mode.

13. A water heater system comprising:
a tank for storing water;
a flue assembly positioned within the tank;
a burner in fluid communication with the flue assembly and operable in at least a high input mode and a low input mode;
a controller and a sensor coupled to the controller, wherein the controller activates the burner in the high input mode or the low input mode based on an output reading of the sensor; and
an exhaust assembly in fluid communication with the flue assembly, the exhaust assembly including an outlet, a dilution air intake, and a fan having a negative pressure side and a positive pressure side,
wherein the outlet is arranged on the positive pressure side of the fan and wherein the dilution air intake is arranged on the negative pressure side of the fan,
wherein in the low input mode, flue gases from the burner condense in the flue assembly, and wherein in the high input mode, the flue gases do not condense in the flue assembly.

14. The water heater system of claim 13, wherein the burner is a power burner.

15. The water heater system of claim 13, wherein the burner is an atmospheric burner.

16. The water heater system of claim 13, further comprising wherein the controller is configured to:
determine, based at least partially on a signal received from the sensor, whether a heating requirement can be met using the low input mode;
operate the burner in the high input mode and operate the fan at a first speed sufficient to draw a flow of dilution air into the exhaust assembly through the dilution air intake, upon determining that the heating requirement cannot be met using the low input mode; and
operate the burner in the low-input mode and operate the fan at a second speed sufficient to prevent flue gas from escaping out of the exhaust assembly through the dilution air intake, upon determining that the heating requirement can be met using the low input mode.

17. The water heater of claim 13, wherein the flue assembly fluidly communicates with the exhaust assembly on the negative pressure side of the fan.

18. The water heater of claim 13, wherein the flue assembly fluidly communicates with the exhaust assembly on the positive pressure side of the fan.

19. The water heater of claim 13, wherein at least a portion of the exhaust assembly is located underneath the tank.

* * * * *